United States Patent
Landis et al.

(10) Patent No.: US 11,143,164 B1
(45) Date of Patent: Oct. 12, 2021

(54) VERTICAL WINDMILL BLADE

(71) Applicant: Epic Metals Corporation, Rankin, PA (US)

(72) Inventors: David F. Landis, Murrysville, PA (US); Benjamin Landis, Export, PA (US)

(73) Assignee: Epic Metals Corporation, Rankin, PA (US)

(*) Notice: Subject to any disclaimer, the term of this patent is extended or adjusted under 35 U.S.C. 154(b) by 78 days.

(21) Appl. No.: 16/393,295

(22) Filed: Apr. 24, 2019

Related U.S. Application Data

(60) Provisional application No. 62/662,937, filed on Apr. 26, 2018.

(51) Int. Cl.
*F03D 3/06* (2006.01)
*F03D 3/00* (2006.01)

(52) U.S. Cl.
CPC ............ *F03D 3/065* (2013.01); *F03D 3/005* (2013.01); *F03D 3/061* (2013.01); *F05B 2250/712* (2013.01)

(58) Field of Classification Search
CPC .......... F03D 3/065; F03D 3/005; F03D 3/061; F03D 7/06; F03D 3/067; F03D 3/068; F05B 2250/712; F05B 2240/213; F05B 2240/311
See application file for complete search history.

(56) References Cited

U.S. PATENT DOCUMENTS

| | | | |
|---|---|---|---|
| 752,764 A * | 2/1904 | Dunne | F03D 7/0248 417/35 |
| 5,375,324 A | 12/1994 | Wallace et al. | |
| 5,454,694 A * | 10/1995 | O'Dell | F03D 9/25 416/197 A |
| 8,177,481 B2 * | 5/2012 | Liang | F03D 3/067 415/4.2 |
| 8,217,526 B2 | 7/2012 | Devitt | |
| 8,430,631 B2 | 4/2013 | Olsen | |
| 8,657,581 B2 | 2/2014 | Pilpel et al. | |
| 8,899,937 B2 * | 12/2014 | Graham | F03D 7/0268 416/231 R |
| 9,188,102 B2 | 11/2015 | Krishnamurthy et al. | |

(Continued)

FOREIGN PATENT DOCUMENTS

| | | | | |
|---|---|---|---|---|
| WO | WO-2005050007 A1 * | 6/2005 | ............ | F03D 3/068 |
| WO | WO-2010131891 A2 * | 11/2010 | ............ | F03D 3/061 |

OTHER PUBLICATIONS

Babu et al., "The Material Selection for Typical Wind Turbine Blades Using a MADM Approach & Analysis of Blades", MCDM, 2006, pp. 1-11, Greece.

(Continued)

*Primary Examiner* — Eldon T Brockman
(74) *Attorney, Agent, or Firm* — The Webb Law Firm

(57) ABSTRACT

A blade for a vertical windmill includes an arcuate blade member having an interior surface and an exterior surface, the arcuate blade member including at least one aperture extending through the arcuate blade member; and at least one layer of flexible sheet material applied to the exterior or interior surface of the arcuate blade member, the at least one layer of flexible sheet material covering the at least one aperture in the arcuate blade member on the exterior or interior surface.

20 Claims, 12 Drawing Sheets

(56) References Cited

U.S. PATENT DOCUMENTS

| | | | |
|---|---|---|---|
| 9,752,555 B2 | 9/2017 | Gdovic | |
| 2009/0066088 A1* | 3/2009 | Liang | F03D 3/067 |
| | | | 290/55 |
| 2010/0135802 A1* | 6/2010 | Yeh | F01D 5/145 |
| | | | 416/91 |
| 2010/0327596 A1* | 12/2010 | Williams | F03B 17/063 |
| | | | 290/54 |
| 2011/0097211 A1 | 4/2011 | Rudling | |
| 2011/0164977 A1* | 7/2011 | Vallejo | F03D 3/064 |
| | | | 416/145 |
| 2012/0230830 A1 | 9/2012 | Lind et al. | |
| 2013/0017083 A1* | 1/2013 | Graham | F03D 7/0268 |
| | | | 416/1 |
| 2014/0119933 A1 | 5/2014 | Bagepalli et al. | |
| 2014/0119937 A1 | 5/2014 | Fang et al. | |
| 2015/0337809 A1* | 11/2015 | Jordan, Sr. | F03D 9/11 |
| | | | 290/50 |

OTHER PUBLICATIONS

Brown et al, "Design and Anlysis of a Vertical Axis Thermoplastic Composite Wind Turbine Blade", Plastics Rubber and Composites, 2010, pp. 111-121, United Kingdom.

Dube et al, "Review of Straight Bladed Vertical Axis Wind Turbine", IJARIIE, 2016, pp. 808-811, vol. 2, Issue 2.

Reza, "Construction of a helical vertical axis wind turbine for electricity supply," Computer-Aided Design and Applications, 2015, pp. 1-4.

Zhong-Jia et al, "Design and Analysis of Small-Scale Lift-Type Vertical-Axis Wind Turbine Using Composite Blade", Polymer and Polymer Composites, 2014, pp. 423-430.

"Wind Turbine and Wind Blade Fundamentals", TPI Composites Inc., http://www.tpicomposites.com/English/industries/wind-energy/wind-turbine-and-wind-blade-fundmentals/default.aspx, 2018, 4 pgs.

* cited by examiner

VERTICAL WINDMILL BLADE

CROSS REFERENCE TO RELATED APPLICATION

The present application claims priority to U.S. Provisional Patent Application No. 62/662,937, filed on Apr. 26, 2018, which is incorporated herein by reference in its entirety.

BACKGROUND OF THE INVENTION

Field of the Invention

The present invention relates to an arcuate blade for a vertical windmill and, in particular to an arcuate blade in which a flexible sheet material is applied to a surface of the blade to cover one or more apertures extending through the blade.

Description of Related Art

Vertical windmill turbines, also known as Savonius windmill turbines, are well known in the art; see for example, U.S. Pat. No. 9,752,555, the disclosure of which is hereby incorporated by reference in its entirety. The blades of vertical windmills typically have an arcuate shape adapted to coact with wind to direct the wind to drive a rotor which, in turn, generates electricity. These types of windmill blades are not aerodynamically designed in the manner that horizontal windmill turbine blades typically are, but are configured to maximize surface contact between the blade and the wind to drive the rotor. Typically, the arcuate blades are made of metal, such as aluminum, although they can be made from a polymeric material, such as a fiber-reinforced plastic material.

The efficiency of the arcuate blade is in large part dependent upon the weight of the blade. Generally, the lighter the blade, the more efficient the turbine. Typically, as described, the arcuate blade will be made from a metal material.

SUMMARY OF THE INVENTION

According to one example of the present disclosure, a blade for a vertical or Savonius windmill is provided having an arcuate shape wherein the blade includes a frame structure having a fabric material laid over the frame structure. More specifically, the frame structure is a unitary blade structure having cutouts or slots, and the fabric laid over the cutouts or slots is attached to cover the cutouts or slots on at least one side of the blade. The fabric material can be a polymer material, such as a fabric made of PTFE, PVC/PVDF, and/or ETFE material. The blade is configured to be more efficient with respect to converting wind energy to electric power by utilizing the fabric material in place of metal material to reduce the overall weight of the blade.

According to a particular example of the present disclosure, a blade for a vertical windmill is provided. The blade includes an arcuate blade member, the arcuate blade member being curved about a center of curvature and having an interior surface oriented toward the center of curvature and an exterior surface oriented away from the center of curvature, the arcuate blade member including at least one aperture extending through the arcuate blade member; and at least one layer of flexible sheet material applied to the exterior or interior surface of the arcuate blade member, the at least one layer of flexible sheet material covering the at least one aperture in the arcuate blade member on the exterior or interior surface.

The arcuate blade member may be formed from a metal material. The metal material may include aluminum. The at least one layer of flexible sheet material may be formed from a non-porous polymeric sheet material. The non-porous polymeric sheet material may include polytetrafluoroethylene (PTFE), polyvinyl chloride (PVC), polyvinylidene fluoride (PVDF), ethylene tetrafluoroethylene (ETFE), and/or fiber-reinforced polymeric material.

The at least one aperture in the arcuate blade member may include a plurality of slots, perforations or cutouts defined in the arcuate blade member.

The arcuate blade member may include a unitary frame, and the at least one aperture may be a large central opening within the unitary frame.

The blade may also include a rolling arrangement connected to the at least one layer of flexible sheet material, the rolling arrangement being configured to extend and retract the at least one layer of flexible sheet material to selectively cover or expose the at least one aperture. The rolling arrangement may be in communication with a controller and a sensor configured to operate the rolling arrangement to selectively cover or expose the at least one aperture based on wind conditions.

The at least one layer of flexible sheet material may include a flexible solar fabric configured to generate electricity.

According to another example of the present disclosure, a vertical windmill is provided. The vertical windmill includes a frame, and at least one rotor assembly supported on the frame, the at least one rotor assembly being configured to rotate about a longitudinal axis. The at least one rotor assembly includes at least two windmill blades extending parallel to the longitudinal axis. Each of the at least two windmill blades includes an arcuate blade member, the arcuate blade member being curved about a center of curvature extending parallel to the longitudinal axis and having an interior surface oriented toward the center of curvature and an exterior surface oriented away from the center of curvature, the arcuate blade member including at least one aperture extending through the arcuate blade member; and at least one layer of flexible sheet material applied to the exterior or interior surface of the arcuate blade member, the at least one layer of flexible sheet material covering the at least one aperture in the arcuate blade member on the exterior or interior surface.

The arcuate blade member of each blade may be formed from aluminum. The at least one layer of flexible sheet material may be formed from a non-porous polymeric sheet material.

The at least one aperture in the arcuate blade member of each blade may include a plurality of slots, perforations or cutouts defined in the arcuate blade member.

The arcuate blade member of each blade may include a unitary frame, and the at least one aperture may be a large central opening within the unitary frame.

According to another example of the present disclosure, a method of constructing a blade for a vertical windmill is provided. The method includes providing a flat sheet of metal material; forming at least one aperture in the flat sheet of metal material extending through the flat sheet of metal material; bending the flat sheet of metal material to form an arcuate blade member curved about a center of curvature, the arcuate blade member having an interior surface oriented toward the center of curvature and an exterior surface oriented away from the center of curvature; and applying at least one layer of flexible sheet material to the exterior or interior surface of the arcuate blade member, the at least one layer of flexible sheet material covering the at least one aperture in the arcuate blade member on the exterior or interior surface.

The arcuate blade member of each blade may be formed from aluminum. The at least one layer of flexible sheet material may be formed from a non-porous polymeric sheet material.

The step of forming the at least one aperture in the flat sheet of metal material may include forming a plurality of slots, perforations or cutouts extending through the flat sheet of metal material.

The flat sheet of metal material may include a unitary frame, and the at least one aperture includes a large central opening within the unitary frame.

These and other features and characteristics of the present invention, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
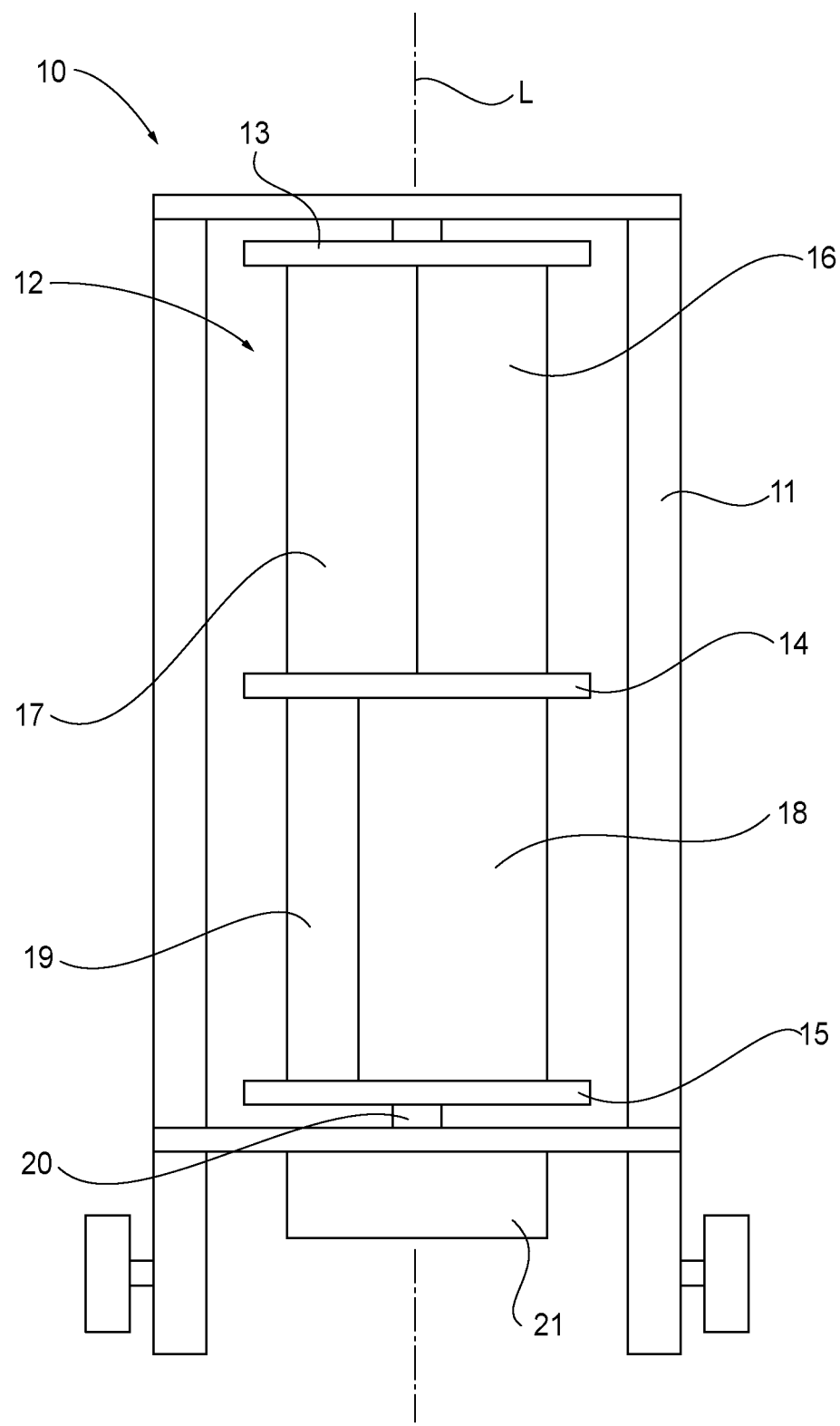
FIG. 1 is a front elevation view of a vertical windmill according to a prior art example.
Figure 2:
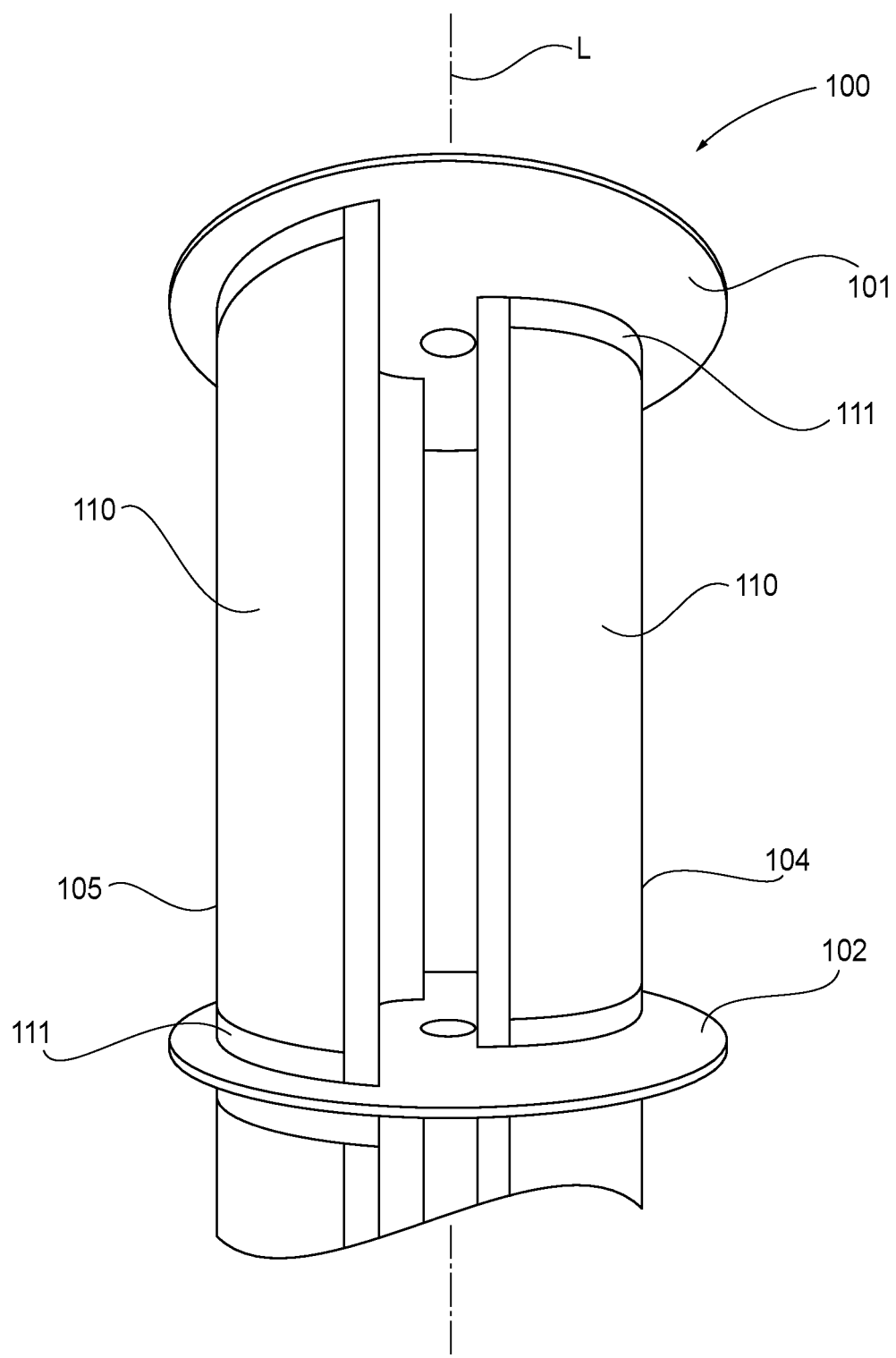
FIG. 2 is a perspective view of the upper portion of a rotor assembly for a vertical windmill according to an example of the present disclosure.
Figure 3:
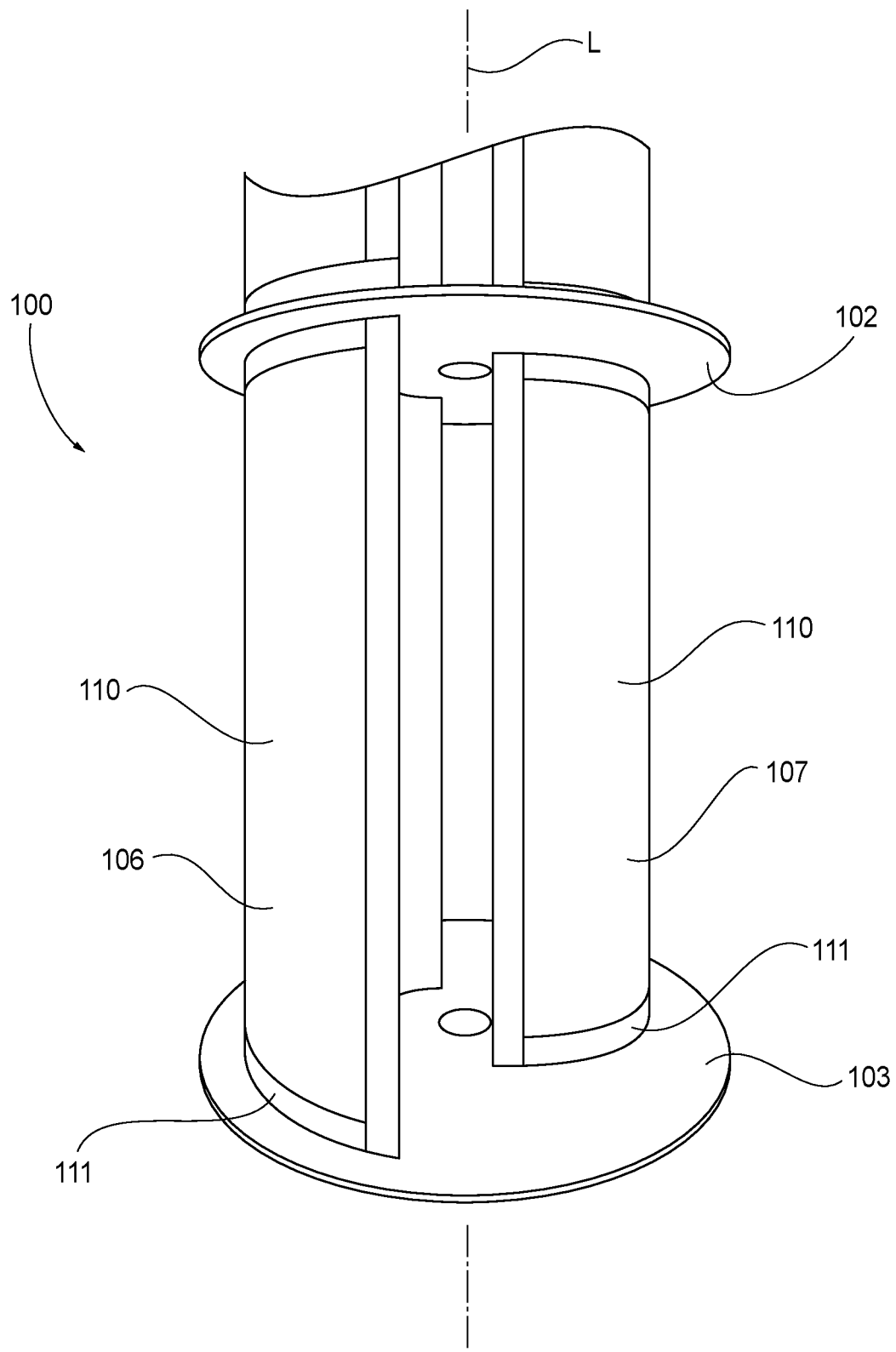
FIG. 3 is a perspective view of the lower portion of the rotor assembly of FIG. 2.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings and described in the following specification are simply exemplary embodiments or aspects of the disclosure. Hence, specific dimensions and other physical characteristics related to the examples disclosed herein are not to be considered as limiting.

With reference to FIG. 1, a vertical windmill 10 or Savonius windmill is shown in accordance with a known prior art example. In particular, the windmill 10 shown in FIG. 1 corresponds to the Savonius windmill disclosed in U.S. Pat. No. 9,752,555, the disclosure of which is hereby incorporated by reference in its entirety. The windmill 10 includes a frame 11 for structurally supporting the windmill 10. The windmill 10 includes at least one rotor assembly 12 rotatably supported on the frame 11. The at least one rotor assembly 12 is configured to rotate about a longitudinal axis L. As shown, the rotor assembly 12 is supported on a drive shaft 20 extending from near the bottom of the frame 11 to the top of the frame 11 and through the rotor assembly 12. The rotor assembly 12 includes an upper support disc 13, a middle support disc 14, and a lower support disc 15, all connected to the drive shaft 20. A first arcuate blade 16 and a second arcuate blade 17 extend between the upper support disc 13 and the middle support disc 14. A third arcuate blade 18 and a fourth arcuate blade 19 extend between the middle support disc 14 and the lower support disc 15. The arcuate blades 16, 17, 18, 19 are configured to direct wind passing through the rotor assembly 12 between the respective sets of the blades 16, 17, 18, 19 such that the wind passes across the interior surfaces of the blades 16, 17, 18, 19, thereby causing the rotor assembly 12 to rotate. Additional details regarding the construction and arrangement and relative positioning and orientation of the blades 16, 17, 18, 19 can be found in U.S. Pat. No. 9,752,555.

The drive shaft 20 is configured to rotate with the rotor assembly 12 and is connected to a transmission box 21 positioned at the bottom of the frame 11. The transmission box 21 may include the mechanical (transmission gears, brakes, etc.) and electrical (generator, transformer, inverter, etc.) components necessary to convert the rotational energy imparted to the rotor assembly by the wind to electrical power and to transmit the generated electrical power to the local power grid and/or to battery storage in a manner known to those having ordinary skill in the art.

With reference to FIGS. 2-6, a rotor assembly 100 for a vertical windmill, such as the vertical windmill 10 discussed above with reference to FIG. 1, is shown in accordance with an example of the present disclosure. The rotor assembly 100 is configured to rotate about a longitudinal axis L and includes at least two arcuate windmill blades 104, 105 extending parallel to the longitudinal axis L. In particular, the rotor assembly 100 may include a set of two upper arcuate windmill blades 104, 105 extending between an upper support disc 101 and a middle support disc 102 and a set of two lower arcuate windmill blades 106, 107 extending between the middle support disc 102 and a lower support disc 103. The arcuate windmill blades 104, 105, 106, 107 may be shaped, arranged, oriented, and connected to the support discs 101, 102, 103 in the manner discussed in U.S. Pat. No. 9,752,555. The rotor assembly 100 may be assembled to the drive shaft 20 and frame 11 of the vertical windmill 10 in the manner discussed in U.S. Pat. No. 9,752,555.

Figure 4:
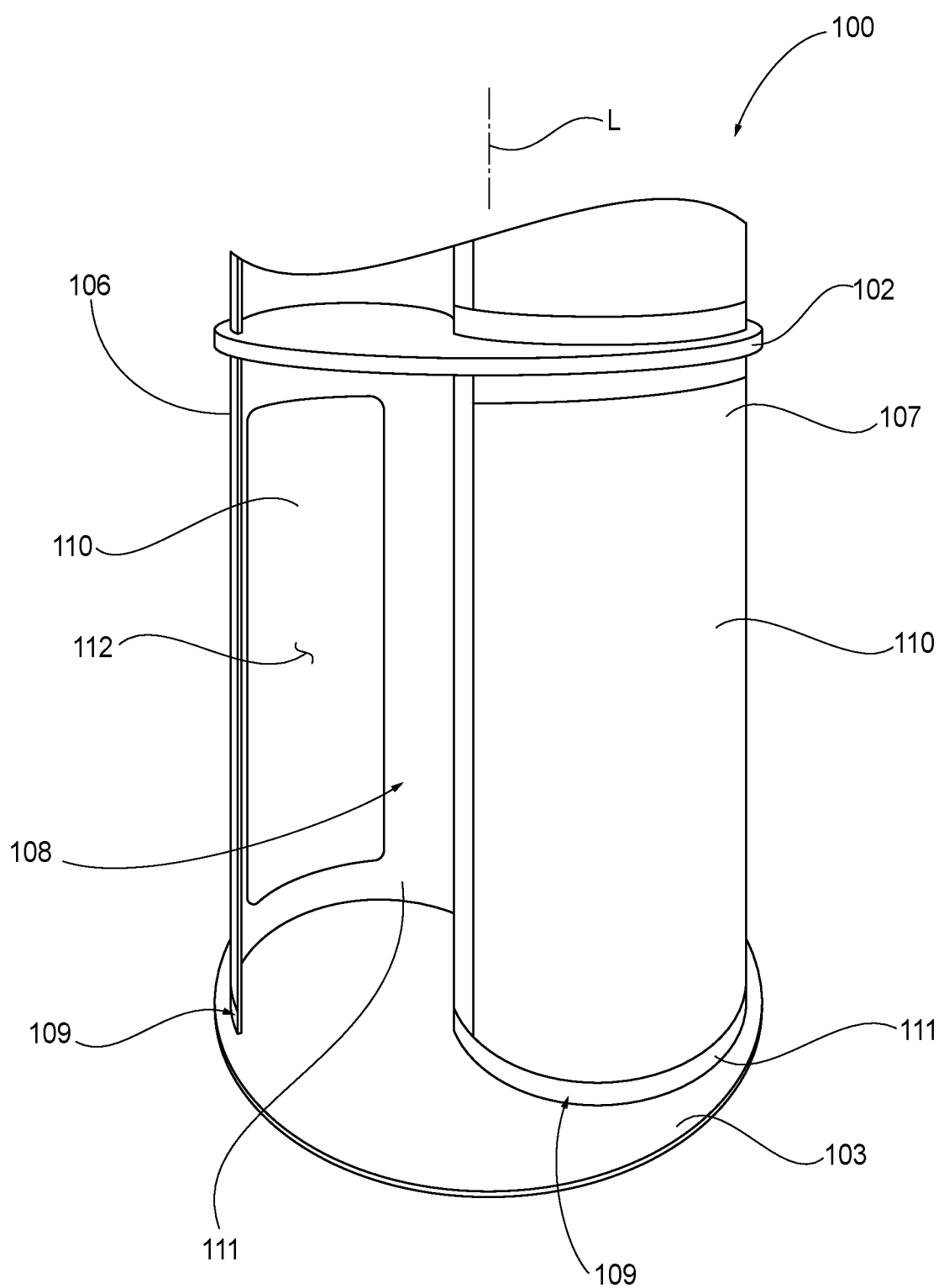
FIG. 4 is another perspective view of the lower portion of the rotor assembly of FIG. 2.
Figure 4A:
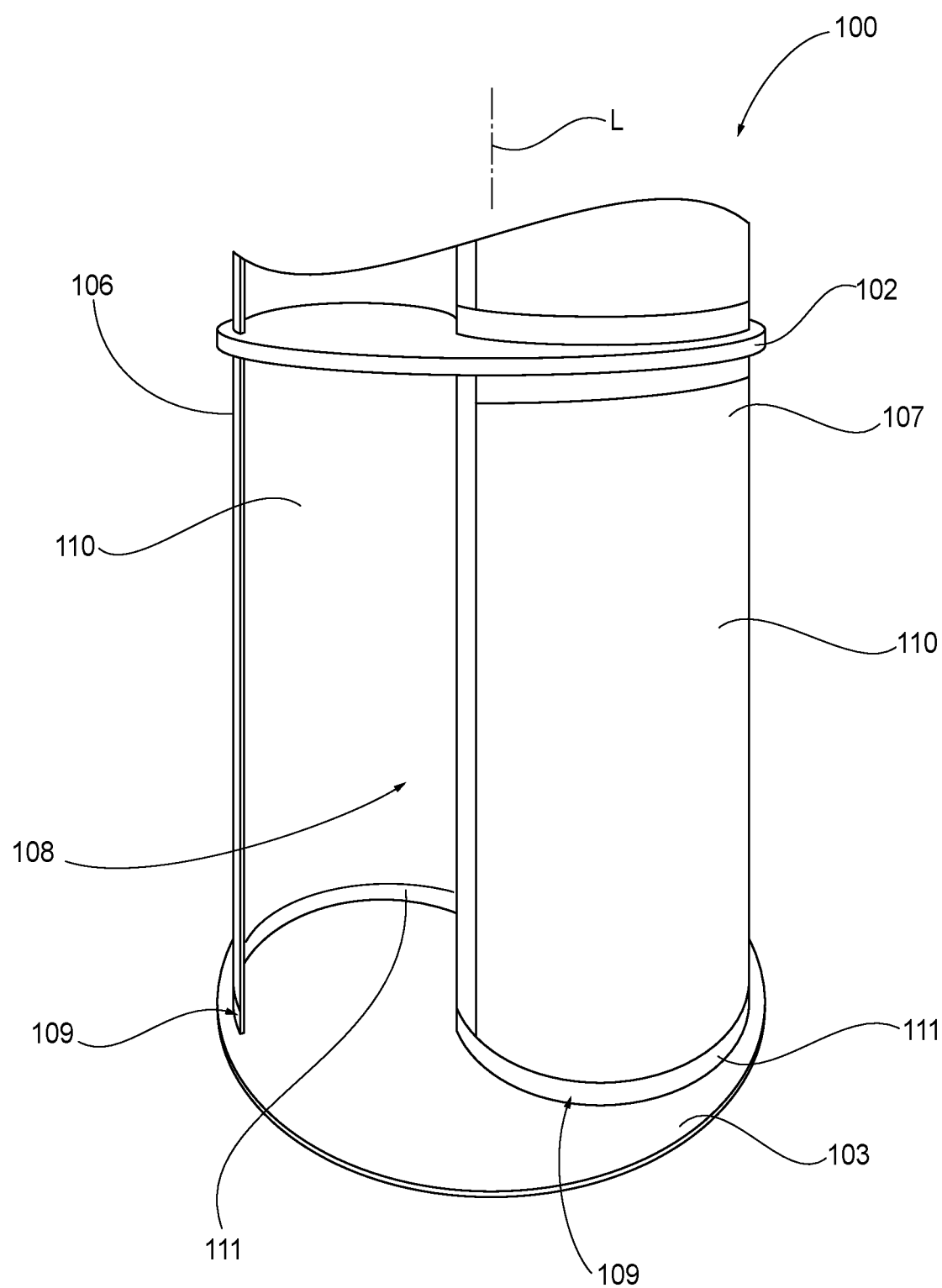
FIG. 4A is a perspective view of the lower portion of the rotor assembly according to another example of the present disclosure.
Figure 5:
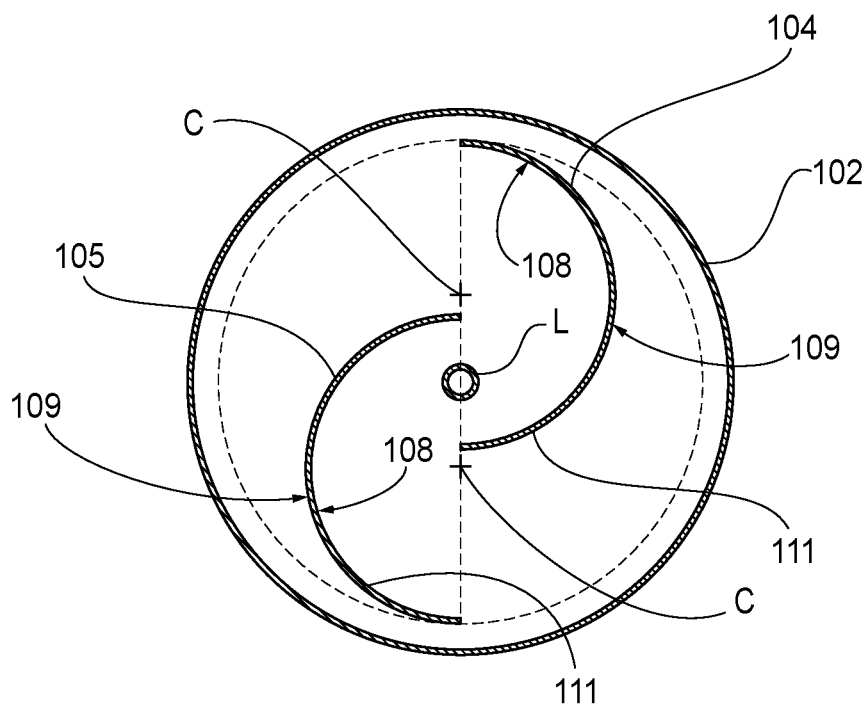
FIG. 5 is a top plan view of the upper portion of the rotor assembly of FIG. 2.
Figure 6:
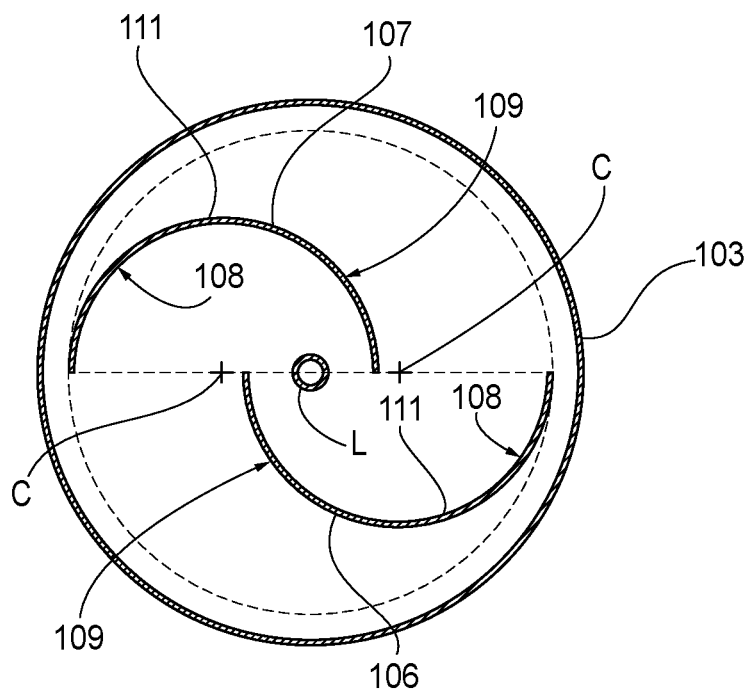
FIG. 6 is a top plan view of the lower portion of the rotor assembly of FIG. 2.

As shown in FIGS. 2-6, each of the arcuate windmill blades 104, 105, 106, 107 includes an arcuate blade member 111 curved about a center of curvature C that extends parallel to the longitudinal axis L. The arcuate blade member 111 has an interior surface 108 oriented toward the center of curvature C and an exterior surface 109 oriented away from the center of curvature 109. The arcuate blade member 111 has at least one aperture 112 extending through the blade member 111 from the interior surface 108 to the exterior surface 109. At least one layer of flexible sheet material 110 is applied to the exterior surface 109 of the arcuate blade member 111 to cover the at least one aperture 112 on the exterior surface 109. Alternatively, the at least one layer of flexible sheet material 110 is applied to the interior surface 108 of the arcuate blade member to cover the at least one aperture 112 on the interior surface 108, in the manner shown in FIG. 4A. According to another example shown in FIG. 4A, a layer of flexible sheet material 110 may be applied to both the exterior surface 109 and the interior surface 108 of the arcuate blade member 111 to cover the at least one aperture 112 on both surfaces 108, 109.

Figure 7:
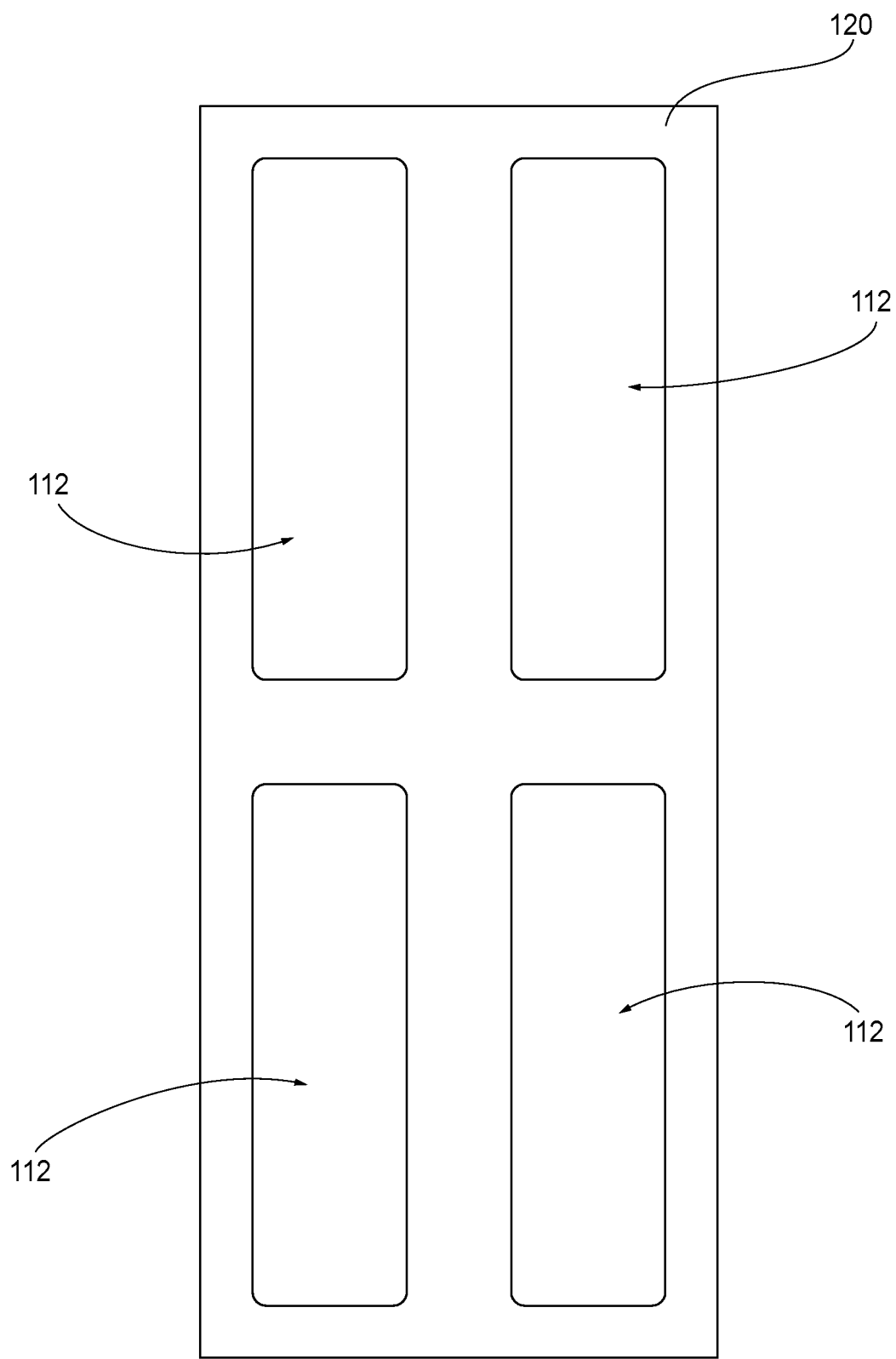
FIG. 7 is a top view of a flat sheet of metal material prior to being formed into an arcuate blade of the rotor assembly of FIG. 2.
Figure 7A:
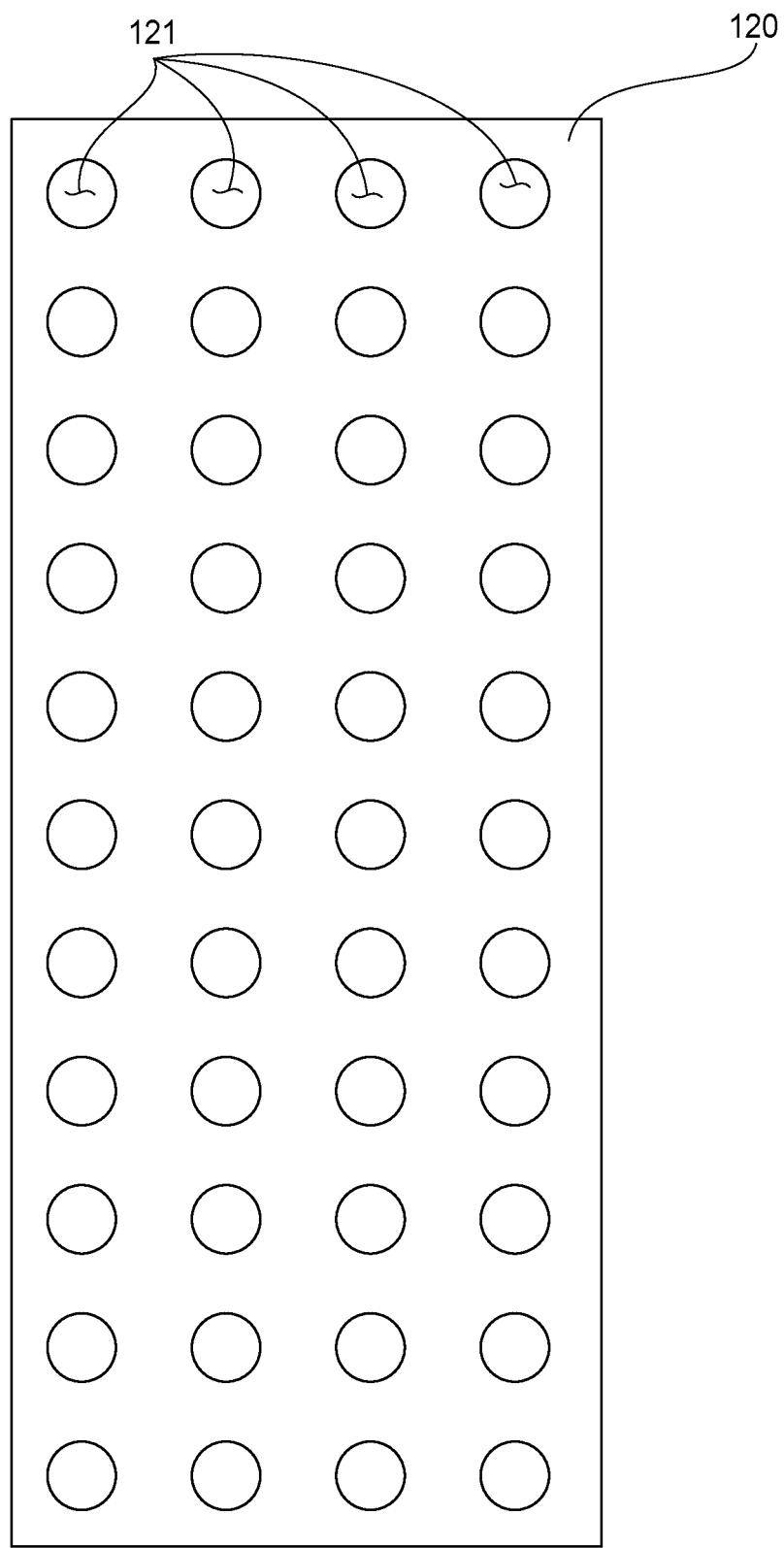
FIG. 7A is a top view of a flat sheet of metal material according to another example of the present disclosure.

With reference to FIG. 7, the arcuate blade member 111 is formed from a flat sheet of metal material 120 having a plurality of apertures 112, which are in the form of slots or cutouts defined therein. According to another example, the plurality of apertures may include a plurality of round holes or perforations 121, as shown in FIG. 7A, instead of slots or cutouts or may include a combination of round holes and slots. According to an example of the present disclosure, the flat sheet of metal material 120 is formed from aluminum, although it is to be appreciated that the metal material may be any metal material found to be suitable to those having ordinary skill in the art. After the plurality of apertures 112 is formed in the flat sheet of metal material 120, the flat sheet 120 is rolled or bent into the curved or arcuate shape of the arcuate blade member 111 shown in FIGS. 2-6.

With reference to FIGS. 2-6, according to an example of the present disclosure, the flexible sheet material 110 is formed from a non-porous polymeric sheet material that is suitable for catching wind as the wind passes through the rotor assembly 100 such that the wind travels along the interior surface 108 of the arcuate blade 104, 105, 106, 107 to drive rotation of the rotor assembly 100 in the same manner as a blade made completely of metal or a rigid polymeric material. In particular, according to an example of the present disclosure, the non-porous polymeric sheet material is polytetrafluoroethylene (PTFE), polyvinyl chloride (PVC), polyvinylidene fluoride (PVDF), ethylene tetrafluoroethylene (ETFE), and/or fiber-reinforced polymeric material. It is to be appreciated that the flexible sheet material 110 may include combinations of these materials or may include other polymeric materials found to be suitable to those having ordinary skill in the art.

Figure 8:
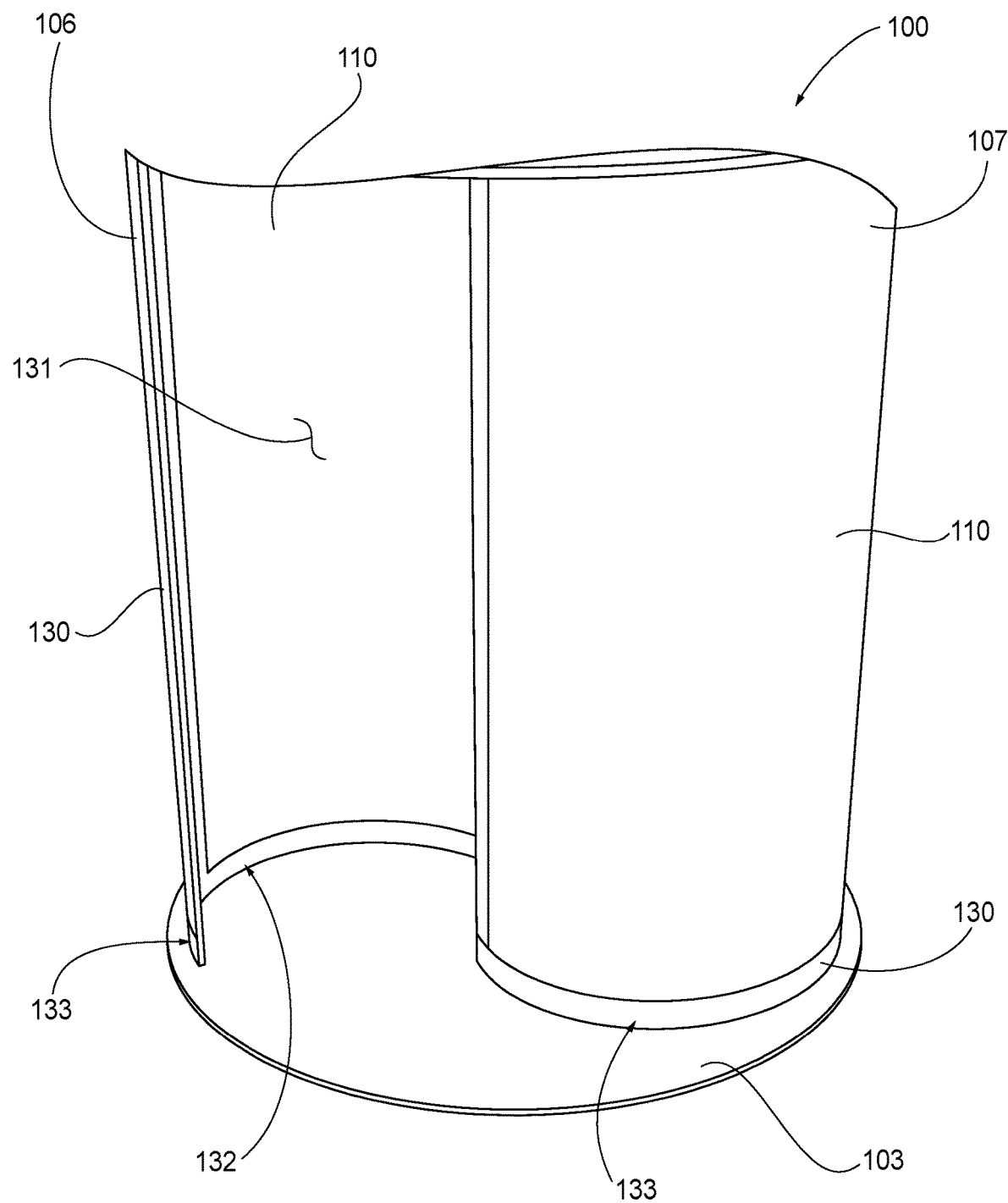
FIG. 8 is a perspective view of a lower portion of the rotor assembly of FIG. 2 including an arcuate blade according to another example of the present disclosure.
Figure 9:
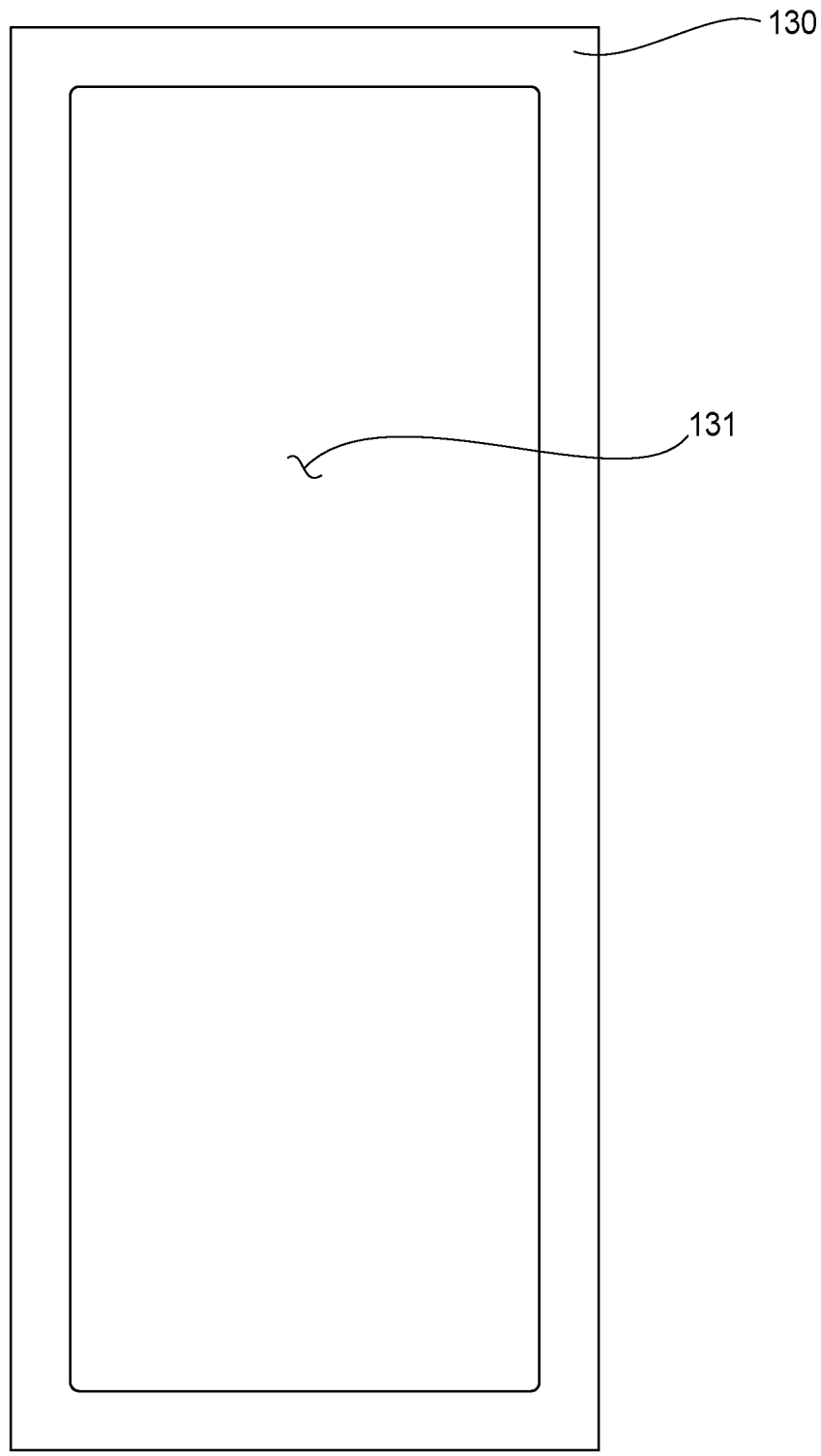
FIG. 9 is a top view of a unitary frame prior to being formed into the arcuate blade of FIG. 8.

With reference to FIGS. 8 and 9, the rotor assembly 100 including the at least two arcuate windmill blades 106, 107 is shown, wherein each arcuate blade 106, 107 includes an arcuate blade member 130 according to another example of the present disclosure. The arcuate blade member 130 according to this example is a unitary frame 130, and the at least one aperture of the blade member is a large central opening within the unitary frame 130. The at least one sheet of flexible material 110 is disposed to cover the large central opening 131. The unitary frame 130 may be formed from a single sheet of metal material 120 as discussed above with reference to FIG. 7, with the large central opening 131 being formed by cutting away the material of the sheet 120. Alternatively, the unitary frame 130 may be formed from separate strips of metal material that are welded or otherwise fastened together. After the unitary frame 130 shown in FIG. 9 is formed, the unitary frame 130 is rolled or bent into the curved or arcuate shape shown in FIG. 8, defining the opposite interior surface 132 and exterior surface 133. The flexible sheet material 110 is then applied to the exterior surface 133 and/or to the interior surface 132 of the unitary frame 130 to form the arcuate blades 106, 107.

According to the examples of FIGS. 2-9, the arcuate windmill blades 104, 105, 106, 107 are substantially lighter in weight in comparison to blades made completely from metal or a rigid polymeric material while maintaining a sufficient material strength. According to the example, the lighter weight of the arcuate windmill blades 104, 105, 106, 107 will improve the overall efficiency of the windmill blades 104, 105, 106, 107 by allowing more wind energy to be transferred by the blades 104, 106, 107, 108 to the drive shaft 20 and, thus, to the transmission box 21 and power generation system. Also, because the blades 104, 105, 106, 107 are lighter in weight, the frame 11 and foundation elements of the windmill can be reduced in size and strength, thus reducing the costs associated with building the windmill. Alternatively, the strength of the frame 11 and foundation elements can be maintained in comparison to prior art vertical windmills, which allows for a taller windmill to be constructed with additional rotor assemblies 100 so as to generate more electric power than prior art windmills.

Figure 10:
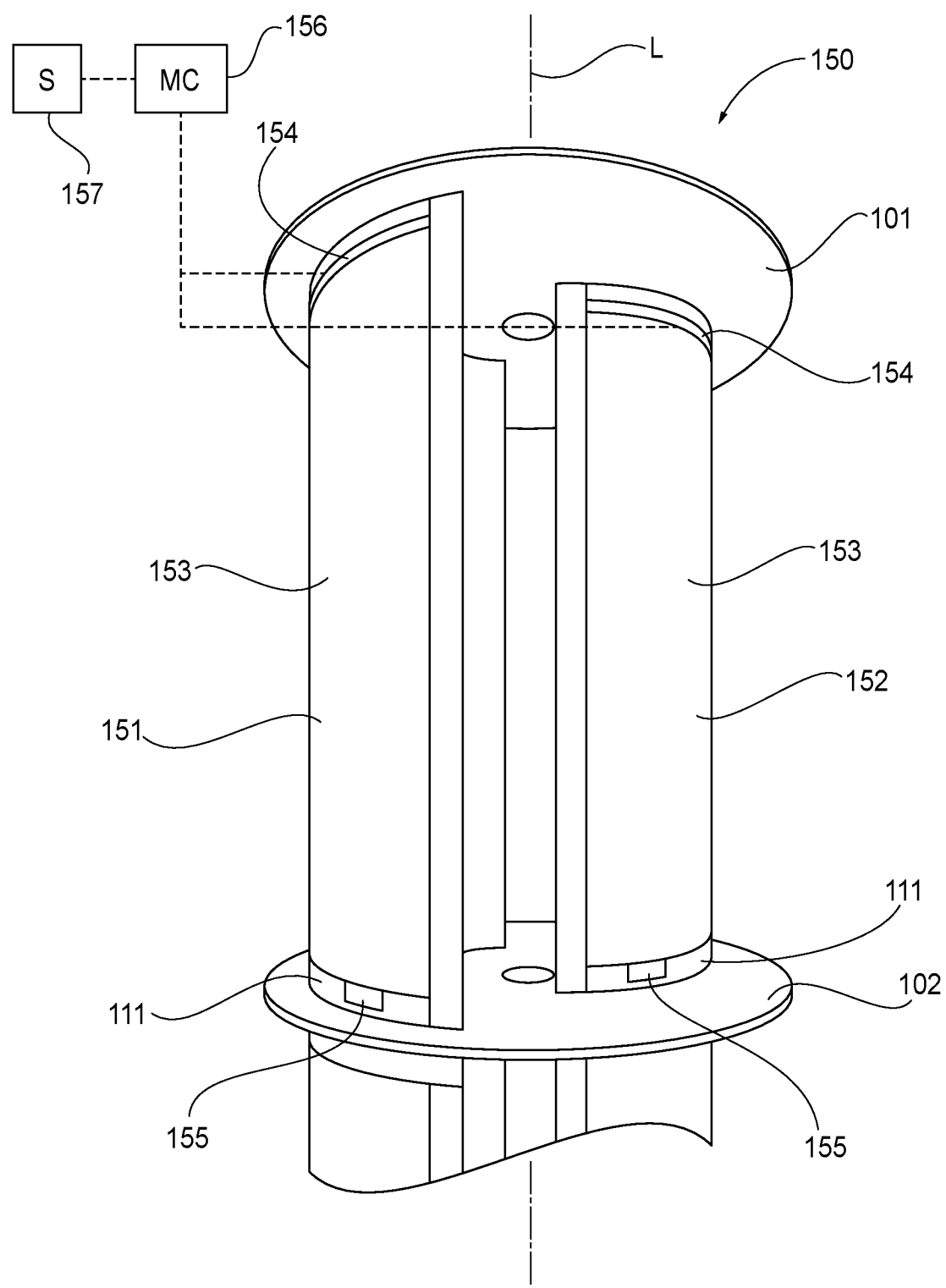
FIG. 10 is a perspective view of a portion of a rotor assembly for a vertical windmill according to another example of the present disclosure.

With reference to FIG. 10, a rotor assembly 150 for a vertical windmill is shown in accordance with another example of the present disclosure. The rotor assembly 150 includes at least two arcuate blades 151, 152 made from arcuate blade members 111, each including at least one aperture, as discussed above with reference the examples of FIGS. 2-9. According to the example of FIG. 10, the flexible sheet material 153 covering the at least one aperture of the arcuate blade member 111 of each arcuate blade 151, 152 is connected along its top side to a rolling arrangement 154 connected to the arcuate blade member 111 and/or to the support disc 101 above the arcuate blade member 111. The rolling arrangement 154 is configured to extend and retract the flexible sheet material 153 to selectively cover or expose the at least one aperture. A tension mechanism 155 is connected to the arcuate blade member 111 and/or the support disc 102 below the arcuate blade member 111. The tension mechanism 155 engages the bottom side of the flexible sheet material 153 to maintain tension on the flexible sheet material 153 in its selectively extended or retracted position. According to the example, the rolling arrangement 154 is provided along the top of the arcuate blade member 111. It is to be appreciated that the rolling arrangement 154 is vertically oriented along one of the lateral edges of the arcuate blade member such that the flexible sheet material 153 is extended or retracted in a horizontal, rather than vertical, direction.

According to the example, the rolling arrangement 154 incorporates a roller and electric motor that are configured to extend and retract the flexible sheet material 153 in a manner similar to a motorized blind. The rolling arrangement 154 on each blade 151, 152 is in communication with a microcontroller 156 located elsewhere in the windmill, which controls the electric motor of each rolling arrangement 154 to selectively extend and retract the flexible sheet material 153. The microcontroller 156 is in communication with a sensor 157 that measures the speed of the drive shaft 20.

Accordingly, the flexible sheet material 153 on each blade 151, 152 can be selectively extended and retracted to selectively cover, expose, or partially expose the at least one aperture in the arcuate blade member 111. The selective extension and retraction of the flexible sheet material 153 on each blade 151, 152 can be controlled by the microcontroller 156 based on the speed of the drive shaft 20 as measured by the sensor 157. The selective covering and exposing of the at least one aperture in each blade 151, 152, in turn, allows for control of the rotational speed of the rotor assembly 150 since wind passing through the at least one aperture will not impart rotational force to the rotor assembly. According to the example, during high-wind conditions, the controller 156 is configured to determine an optimal level of extension of the flexible sheet material 153 on each blade 151, 152 to control the speed of the rotor assembly 150 to a desired maximum rotational velocity. This would allow for a reduction in the size of the brakes on the windmill and reduce wear on the brakes needed to control the velocity of the rotor assembly 150 during high-wind conditions. Currently, brakes that require maintenance are used to control the speed of the windmill rotor assemblies in high-wind conditions so that the windmills are not damaged in high winds. The ability to selectively extend and retract the flexible fabric material 153 covering the at least one aperture in the arcuate blade members 111 would allow for the speed of the rotor assembly 150 to be controlled to a desired maximum or optimal speed for highest energy generation in various wind conditions. This would reduce the energy used for braking the rotor assembly 150 during high winds and the wearing out of the brakes.

Figure 11:
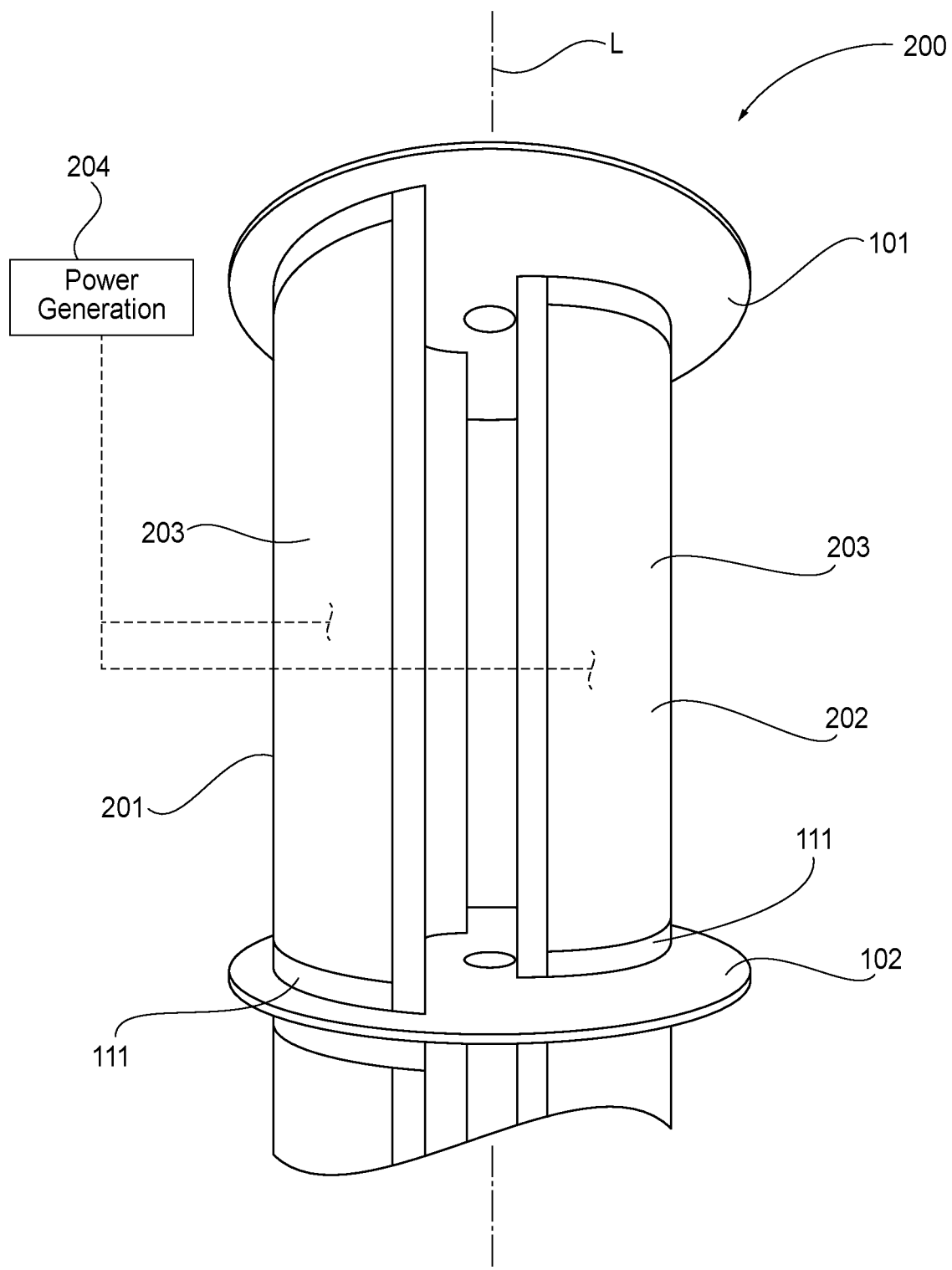
FIG. 11 is a perspective view of a portion of a rotor assembly for a vertical windmill according to another example of the present disclosure.

With reference to FIG. 11, a rotor assembly 200 for a vertical windmill is shown in accordance with another example of the present disclosure. The rotor assembly 200 includes at least two arcuate blades 201, 202 made from arcuate blade members 111, each including at least one aperture, as discussed above with reference to the examples of FIGS. 2-9. According to the example of FIG. 11, the flexible sheet material 153 covering the at least one aperture of the arcuate blade member 111 of each arcuate blade 201, 202 is made from a solar fabric material 203 configured to generate electricity in the manner of a solar panel in a manner known to those having ordinary skill in the art. The solar fabric material 203 is connected to a solar power generation system 204 located elsewhere on the windmill to generate electrical power from the solar fabric material 203 and to transfer the electrical power to the local power grid and/or to battery storage. The solar power generation system 204 may be operated in tandem with the power generation components located in the transmission box of the windmill.

With reference to FIGS. 2-9, according to another example of the present disclosure, a method of constructing an arcuate blade 104, 105, 106, 107 for a vertical windmill is provided. The method includes providing a flat sheet of metal material 120; forming at least one aperture 112, 131 in the flat sheet of metal material 120 extending through the flat sheet of metal material 120; bending the flat sheet of metal material 120 to form an arcuate blade member 111, 130 about a center of curvature C, the arcuate blade member 111, 130 having an interior surface 108, 132 oriented toward the center of curvature C and an exterior surface 109, 133 oriented away from the center of curvature C; and applying at least one layer of flexible sheet material 110 to the exterior surface 109, 133 or the interior surface 108, 132 of the arcuate blade member 111, 130, the at least one layer of flexible sheet material 110 covering the at least one aperture 112, 131 in the arcuate blade member 111, 130 on the exterior surface 109, 133 or the interior surface 108, 132. The metal material of the flat sheet of metal material 120 may be aluminum. The at least one layer of flexible sheet material 110 may be formed from a non-porous polymeric sheet material, such as polytetrafluoroethylene (PTFE), polyvinyl chloride (PVC), polyvinylidene fluoride (PVDF), ethylene tetrafluoroethylene (ETFE), and/or fiber-reinforced polymeric material.

According to one example, the step of forming the at least one aperture in the flat sheet of metal material 120 includes forming a plurality of slots or cutouts 112 extending through the flat sheet of metal material 120.

According to another example, the flat sheet of metal material 120 includes a unitary frame 130, and the at least one aperture includes a large central opening 131 within the unitary frame 130.

It is to be understood that the invention may assume various alternative variations and step sequences, except where expressly specified to the contrary. It is also to be understood that the specific devices and processes illustrated in the attached drawings and described in the specification are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A blade for a vertical windmill, comprising:
an arcuate blade member, the arcuate blade member being curved about a center of curvature and having an interior surface oriented toward the center of curvature and an exterior surface oriented away from the center of curvature, the arcuate blade member comprising at least one aperture extending through the arcuate blade member;
at least one layer of flexible sheet material applied to the exterior or interior surface of the arcuate blade member, the at least one layer of flexible sheet material covering the at least one aperture in the arcuate blade member on the exterior or interior surface; and
a rolling arrangement connected to the at least one layer of flexible sheet material, the rolling arrangement being configured to extend and retract the at least one layer of flexible sheet material to selectively cover or expose the at least one aperture.

2. The blade for a vertical windmill according to claim 1, wherein the arcuate blade member is comprised of a metal material.

3. The blade for a vertical windmill according to claim 2, wherein the metal material comprises aluminum.

4. The blade for a vertical windmill according to claim 1, wherein the at least one layer of flexible sheet material is comprised of a non-porous polymeric sheet material.

5. The blade for a vertical windmill according to claim 4, wherein the polymeric sheet material comprises polytetrafluoroethylene (PTFE), polyvinyl chloride (PVC), polyvinylidene fluoride (PVDF), ethylene tetrafluoroethylene (ETFE), and/or fiber-reinforced polymeric material.

6. The blade for a vertical windmill according to claim 1, wherein the at least one aperture in the arcuate blade member comprises a plurality of slots, perforations or cutouts defined in the arcuate blade member.

7. The blade for a vertical windmill according to claim 1, wherein the arcuate blade member comprises a unitary frame and the at least one aperture comprises a large central opening within the unitary frame.

8. The blade for a vertical windmill according to claim 1, wherein the rolling arrangement is in communication with a controller and a sensor configured to operate the rolling arrangement to selectively cover or expose the at least one aperture based on wind conditions.

9. The blade for a vertical windmill according to claim 1, wherein the at least one layer of flexible sheet material comprises a flexible solar fabric configured to generate electricity.

10. A vertical windmill, comprising:
a frame; and
at least one rotor assembly supported on the frame, the at least one rotor assembly being configured to rotate about a longitudinal axis, the at least one rotor assembly comprising at least two windmill blades extending parallel to the longitudinal axis,
each of the at least two windmill blades comprising:
an arcuate blade member, the arcuate blade member being curved about a center of curvature extending parallel to the longitudinal axis and having an interior surface oriented toward the center of curvature and an exterior surface oriented away from the center of curvature, the arcuate blade member comprising at least one aperture extending through the arcuate blade member;
at least one layer of flexible sheet material applied to the exterior or interior surface of the arcuate blade member, the at least one layer of flexible sheet material covering the at least one aperture in the arcuate blade member on the exterior or interior surface; and
a rolling arrangement connected to the at least one layer of flexible sheet material, the rolling arrangement being configured to extend and retract the at least one layer of flexible sheet material to selectively cover or expose the at least one aperture.

11. The vertical windmill according to claim 10, wherein the arcuate blade member of each blade is comprised of aluminum.

12. The vertical windmill according to claim 11, wherein the at least one layer of flexible sheet material is comprised of a non-porous polymeric sheet material.

13. The vertical windmill according to claim 10, wherein the at least one aperture in the arcuate blade member of each blade comprises a plurality of slots, perforations or cutouts defined in the arcuate blade member.

14. The vertical windmill according to claim 10, wherein the arcuate blade member of each blade comprises a unitary frame and the at least one aperture comprises a large central opening within the unitary frame.

15. The vertical windmill according to claim 10, wherein the rolling arrangement is in communication with a controller and a sensor configured to operate the rolling arrangement to selectively cover or expose the at least one aperture based on wind conditions.

16. A method of constructing a blade for a vertical windmill, comprising:
providing a flat sheet of metal material;
forming at least one aperture in the flat sheet of metal material extending through the flat sheet of metal material;
bending the flat sheet of metal material to form an arcuate blade member curved about a center of curvature, the arcuate blade member having an interior surface oriented toward the center of curvature and an exterior surface oriented away from the center of curvature;
applying at least one layer of flexible sheet material to the exterior or interior surface of the arcuate blade member, the at least one layer of flexible sheet material covering the at least one aperture in the arcuate blade member on the exterior or interior surface; and
adding a rolling arrangement connected to the at least one layer of flexible sheet material, the rolling arrangement being configured to extend and retract the at least one layer of flexible sheet material to selectively cover or expose the at least one aperture.

17. The method according to claim 16, wherein the metal material comprises aluminum.

18. The method according to claim 16, wherein the at least one layer of flexible sheet material is comprised of a non-porous polymeric sheet material.

19. The method according to claim 16, wherein the step of forming the at least one aperture in the flat sheet of metal material comprises forming a plurality of slots, perforations or cutouts extending through the flat sheet of metal material.

20. The method according to claim 16, wherein the flat sheet of metal material comprises a unitary frame and the at least one aperture comprises a large central opening within the unitary frame.

* * * * *